United States Patent Office 2,782,124
Patented Feb. 19, 1957

2,782,124
BRIGHT-DRYING POLISH EMULSIONS

Guido von Rosenberg and Wilhelm Sauer, Gersthofen, Germany, assignors to Farbwerke Hoechst A. G., vormals Meister Lucius & Bruning, Frankfurt am Main Hochst, Germany, a company of Germany No Drawing. Application April 27, 1953,
Serial No. 351,467

Claims priority, application Germany April 29, 1952

9 Claims. (Cl. 106—10)

The present invention relates to bright-drying polish emulsions.

During recent years the use as polishes of aqueous wax emulsions which dry with a gloss, namely the so-called "bright-drying" or "rubless" polish emulsions, has become increasingly important. They are advantageously prepared with ester waxes and soaps of weak organic bases as emulsifiers. It is also known and often recommended to use non-ionic emulsifiers. On the other hand, attempts have also been made to use aliphatic hydrocarbons of high molecular weight in bright-drying emulsions which contain ionic emulsifiers and ester waxes. However, the use of hydrocarbons which have not been oxidized with air has been found unsatisfactory especially owing to the great difficulty of obtaining sufficiently fine emulsification. Air-oxidized hydrocarbons, on account of their content of acid groups, can be worked up more easily with ionic emulsifiers. Consequently, they are often used incorporated in the form of air-oxidized microcrystalline waxes in emulsions containing ionic emulsifiers. This is done, more especially, in order to reduce the cost of the wax mixtures, which generally contain a considerable amount of the much more expensive carnauba wax. However, no substantial increase in the gloss of the polish has been obtained in this manner.

Nothing has been known hitherto with regard to the joint use of solid, aliphatic hydrocarbons and nonionic emulsifiers for preparing aqueous wax emulsions. It would not be obvious to do this since the action of air-oxidized hydrocarbons in promoting emulsification is naturally much more pronounced when ionic emulsifiers forming soaps with the acid constituents of the air-oxidized waxes are used.

Now, we have found that surprisingly the gloss of waxy bright-drying wax emulsions containing nonionic emulsifiers can be substantially enhanced by addition of solid air-oxidized or non-oxidized aliphatic hydrocarbons which do not melt at too low a temperature provided that as wax components there are used ester waxes known to be suitable for the preparation of bright-drying emulsions and having a saponification number above 100. By working in an appropriate manner, stable, finely dispersed emulsions are obtained which, in comparison with the corresponding products containing no solid hydrocarbons, yield on drying, a gloss which is enhanced to a higher or smaller degree. The melting point of the air-oxidized or non-oxidized aliphatic hydrocarbons should lie above about 65° C., advantageously above about 85° C. The increase in gloss is very valuable from the commercial point of view, since the bright-drying emulsions hitherto known have the great drawback that the gloss obtained with them is, in general, much inferior to that of the floor waxes subsequently polished extra bright by rubbing.

Even the addition of a few parts percent of the solid aliphatic hydrocarbon has an appreciable effect. The proportion may range from about 5 percent to about 50 percent calculated upon the quantity of the ester wax. The most favorable proportion of solid aliphatic, air-oxidized or non-oxidized aliphatic hydrocarbons lies, in general, between about 15 percent and about 35 percent, calculated upon the solids content of the emulsion. The increase in gloss obtained with the emulsions prepared according to this invention by simply drying them up on a support, amounts in general to 10%–20%, calculated upon the gloss of an emulsion without addition of the said hydrocarbons. In some cases, the percentage increase is still higher. Accordingly, the invention provides an important advance in the art.

Among the ester waxes suitable as such for the preparation of bright-drying emulsions and having a saponification number above 100, for instance, the after esterified oxidation products of crude montan wax can be used with advantage.

By oxidizing crude montan wax, high molecular wax acids with an acid number above 100 are obtained. In general, these are mono-carboxylic aliphatic acids. The method of oxidation and the products obtained thereby are known. In the case of the ester waxes suitable for the present invention, the said wax acids are esterified with low-molecular, polyhydric aliphatic alcohols, for instance, ethylene glycol, glycerol, 1.3-propylene glycol, 1.4-butylene glycol, 1.3-butylene glycol or aliphatic glycols with 6 carbon atoms. It is not advisable to use for the esterification alcohols containing more than 6 carbon atoms. The method of esterification of the wax acids with the said polyhydric alcohols and the ester waxes obtained thereby are, likewise, known.

Particularly suitable are those hydrocarbons having a relatively high melting point, for instance, the waxes known commercially as microcrystalline waxes and having a melting point of between 85° C. and 95° C. or air-oxidized commercial microcrystalline waxes having a melting point of between 80° C. and 85° C. and a saponification number of between 45 and 95. Air-oxidized or non-oxidized synthetic paraffins obtained according to the Fischer-Tropsch method or a similar method and having a high melting point are also very useful.

By the known oxidation with air of the solid high molecular hydrocarbons, for instance, the microcrystalline waxes above mentioned, mixtures of carboxylic acids, alcohols, ketones and esters are usually obtained.

Among the nonionic emulsifiers there are most suitable those which are especially effective in emulsifying alone the ester waxes having a high saponification number. As examples there may be mentioned the products obtained by the additive combination of ethylene oxide with suitable fatty alcohols. Of particular advantage are saturated or unsaturated fatty alcohols having a long carbon chain and which have been reacted with a great number of ethylene oxide molecules. Mono-oleates or palmitates of poly-oxyethylene sorbitan are also quite effective.

Suitable nonionic emulsifiers are, quite generally, the products which are obtained by reaction of several mols of ethylene oxide with one mol each of higher molecular alcohols, carboxylic acids, amines or alkyl phenols. These products and their value as emulsifiers are generally known. Furthermore, there may be used monoglycerides of higher molecular fatty acids and their reaction products with ethylene oxide. These emulsifiers are also well known. The emulsifiers are preferably used in a proportion of at least 8 percent of the total quantity of the ester wax and the hydrocarbon. It is advantageous to use at least about 11 percent of the emulsifier. There is no critical upper limit but if too much emulsifier is added, the polish prepared with the emulsion is too soft. The upper limit is generally about 20 percent.

The suitable ester waxes, aliphatic hydrocarbons and emulsifiers are not confined to the substances named above.

In addition to the ingredients mentioned above, the emulsions may contain the other additions usually applied such as resins, pigments, small quantities of solvents, disinfectants, dyestuffs or the like. Ionic emulsifiers may be used in addition to the non-ionic emulsifiers.

The following examples serve to illustrate the invention but they are not intended to limit it thereto, the parts being by weight:

Example 1

A bright-drying polish emulsion was prepared from:

8.00 parts of a wax obtained by esterification of the oxidation product of deresinified crude montan wax and ethylene glycol, said wax having a melting point of 80° C.–83° C., an acid number of 17 and a saponification number of 165
3.50 parts of an air-oxidized micro-crystalline wax, melting at 83° C.–85° C. and having an acid number of 30–35
2.10 parts of the addition product of ethylene oxide with a mixture of fatty alcohols having a chain of 16–18 carbon atoms
0.03 part of triethanolamine
86.37 parts of water
100.00 parts The emulsion was prepared as follows:
The waxes are heated together with the emulsifier to slightly above 100° C. When a homogeneous melt has been obtained, the triethanolamine, diluted with a little water and pre-heated to about 80° C., is added to the melt before the beginning of the emulsification proper. The water is then added, while stirring, in small, gradually increasing portions, care being taken that before each addition of water complete homogenization has taken place. When one third of the total amount of water has been introduced, the rest can be added quickly.

The bright-drying gloss produced with this emulsion amounts to 35 percent whereas that of a comparable emulsion which is free from microcrystalline wax contains instead the same quantity of the said ester wax amounts only to 15 percent.

The bright-drying gloss was determined by means of the known measuring device of the firm Dr. B. Lange, Berlin-Zehlendorf. Both emulsions were applied to black linoleum in exactly the same manner, care being taken that the drying time as well as all other conditions were the same in both cases. The gloss was compared with the gloss of a black glass plate which was taken as a gloss of 100 percent in this case.

Example 2

A bright-drying emulsion was prepared from:

8.0 parts of a wax obtained by esterification of the oxidation product of a mixture of deresinified and non deresinified crude montan wax with a mixture of ethylene glycol and butylene glycol, said wax having a melting point of 80° C., an acid number of 25 and a saponification number of 140
1.9 parts of a non oxidized micro-crystalline wax which melts at 91° C.–93° C. and has an acid number of 0
2.0 parts of the addition product of ethylene oxide to a mixture of fatty alcohols having a chain of 16–18 carbon atoms
88.1 parts of water
100.0 parts The emulsion was prepared and the comparative gloss measured in the manner described in Example 1. The following gloss values were obtained:

Percent
Emulsion prepared as above described_____ 68
Emulsion prepared without the microcrystalline wax__ 55

Example 3

An emulsion was prepared from:

8.70 parts of the ester wax mentioned in Example 2
1.60 parts of air-oxidized high melting paraffine obtained by the Fischer-Tropsch method which has a melting point of 93° C. and an acid number of 21
1.80 parts of a mono-palmitate of a poly-oxyethylene sorbitan
0.01 part of a dyestuff soluble in oil (for instance Sudan Red B)
87.89 parts of water
100.00 parts The preparation of the emulsion and the measurement of the comparative gloss are the same as those described in Example 1. The following gloss values were obtained:

Percent
Emulsion prepared as above described_____ 60
Emulsion without microcrystalline wax_____ 55

The oil-soluble dyestuff is dissolved in the melt of the wax and the emulsifier before the beginning of the emulsification proper.

Example 4

An emulsion was prepared from:

7.8 parts of the ester-wax mentioned in Example 2
2.6 parts of air-oxidized microcrystalline wax, having a melting point of 83° C.–85° C. and an acid number of 20–25
1.8 parts of the addition product of ethylene oxide with a mixture of fatty alcohols having a chain of 16–18 carbon atoms
87.8 parts of water
100.0 parts 15.0 parts of a 10 percent shellac solution.

The shellac solution was prepared in the usual manner by cautiously dissolving, with the aid of heat, dewaxed shellac in an aqueous solution of triethanolamine which corresponded to half the acid number of the shellac; it was then filled and the solution was then made up to the above concentration. Any undissolved shellac particles which may still be present are filtered off. When cold, the above quantiy of this shellac solution was added to the cold emulsion. The emulsion was prepared as described in Example 1. The folowing gloss values were obtained:

Percent
Emulsion prepared as above described_____ 60
Emulsion without microcrystalline wax_____ 50

Example 5

An emulsion was prepared from:

8.0 parts of a wax obtained by esterification of the oxidation product of deresinified crude montan wax with butylene glycol and which wax contained so much deresinified crude montan wax that it had a melting point of 82° C., an acid number of 30 and a saponification number of 120
2.5 parts of an air-oxidized microcrystalline wax having a melting point of 85° C.–87° C. and an acid number of 13–15
2.2 parts of a mono-oleate of a poly-oxyethylene sorbitan
87.2 parts of water
0.1 part of a 30 percent formaldehyde solution
100.0 parts The emulsion was prepared as described in Example 1. The formaldehyde was added to the finished cold emulsion. It serves as disinfectant.

The following gloss values were obtained:

| | Percent |
|---|---|
| Emulsion prepared as above described | 45 |
| Emulsion without microcrystalline wax | 40 |

Example 6

An emulsion was prepared from:

- 8.20 parts of the wax mentioned in Example 2
- 0.60 part of a microcrystalline wax, melting at 88° C.–90° C. and having an acid number of 0
- 2.00 parts of a terpene-phenol resin melting at about 140° C.
- 2.00 parts of an addition product of ethylene oxide with a mixture of fatty alcohols with a chain of 16–18 carbon atoms
- 0.05 part of highly dispersed silica gel (Aerosil) of Deutsche Gold- und Silberscheideanstalt, vormals J. Roessler, Frankfurt on Main
- 87.15 parts of water
- 100.00 parts The ester wax is melted together with the resin in the proportion of 1:1 at about 150° C. After cooling to 90° C.–100° C., there were added, according to the above prescription, further quantities of the ester wax and the micro-crystalline wax and, finally, the addition product of ethylene oxide to a mixture of fatty alcohols having a chain of 16–18 carbon atoms. After a homogeneous melt had been obtained, the indicated quantity of Aerosil was added and the emulsion was prepared as described in Example 1.

The following gloss values were obtained:

| | Percent |
|---|---|
| Emulsion prepared as above described | 68 |
| Emulsion without micro-crystalline wax | 52 |

Example 7

An emulsion was prepared from:

- 7.5 parts of the wax mentioned in Example 2
- 1.0 part of microcrystalline wax having a melting point of 88° C.–90° C. and an acid number of 0
- 2.5 parts of a cyclohexanone resin having a softening point of about 85° C.
- 2.2 parts of the addition product of ethylene oxide to a mixture of fatty alcohols having a chain of 16–18 carbon atoms
- 86.8 parts of water
- 100.0 parts The method of procedure corresponds to that of Example 6.

The following gloss values were obtained:

| | Percent |
|---|---|
| Emulsion prepared as above described | 60 |
| Emulsion without microcrystalline wax | 50 |

Example 8

An emulsion was prepared from:

- 7.90 parts of the wax mentioned in Example 2
- 1.90 parts of a 100 percent pretrolate ozocerite having a melting point of 70° C.–72° C.
- 1.90 parts of the addition product of ethylene oxide with a mixture of fatty alcohols having a chain of 16–18 carbon atoms
- 0.02 part of morpholine
- 88.28 parts of water
- 100.00 parts The emulsion is prepared as described in Example 1. The following self-polishing effects were obtained:

| | Percent |
|---|---|
| Emulsion prepared as above described | 57 |
| Emulsion without microcrystalline wax | 50 |

We claim:

1. A solvent-free, self-polishing, aqueous emulsion consisting essentially of an ester wax which is the reaction product of oxidized montan wax and a polyhydric aliphatic alcohol containing at most six carbon atoms, said ester wax having a saponification number of at least 100, a nonionic emulsifier, and a compound selected from the group consisting of high molecular, paraffinic waxes and their air-oxidation products, said compound having a melting point of at least 65° C.

2. A solvent-free, self-polishing, aqueous emulsion as claimed in claim 1 wherein the emulsifier is the reaction product of a higher molecular fatty alcohol and ethylene oxide.

3. A solvent-free, self-polishing, aqueous emulsion as claimed in claim 1 wherein the emulsifier is a mono-oleate of a polyoxyethylene sorbitan.

4. A solvent-free, self-polishing, aqueous emulsion as claimed in claim 1 wherein the emulsifier is a mono-palmitate of a polyoxyethylene sorbitan.

5. A solvent-free, self-polishing, aqueous emulsion as set forth in claim 1 wherein said compound is a microcrystalline wax.

6. A solvent-free, self-polishing, aqueous emulsion as set forth in claim 1 wherein said compound is an air-oxidation product of a microcrystalline wax.

7. A solvent-free, self-polishing, aqueous emulsion consisting essentially of an ester wax which is the reaction product of oxidized montan wax and a polyhydric aliphatic alcohol containing at most six carbon atoms, said ester wax having a saponification number of at least 100, a nonionic emusifier, and a compound selected from the group consisting of high molecular, paraffinic waxes and their air-oxidation products, said compound being present in an amount of about 5 to about 50% calculated upon the amount of ester wax and having a melting point of at least 65° C.

8. A solvent-free, self-polishing, aqueous emulsion consisting essentially of an ester wax which is the reaction product of oxidized montan wax and a polyhydric aliphatic alcohol containing at most six carbon atoms, said ester wax having a saponification number of at least 100, a nonionic emulsifier, and a compound selected from the group consisting of high molecular, paraffinic waxes and their air-oxidation products, said compound being present in an amount of about 5 to 50% calculated upon the amount of ester wax and having a melting point of at least 65° C., the amount of the emulsifier ranging from 8 to about 20% of the total quantity of the ester wax and the hydrocarbon.

9. A solvent-free, self-polishing, aqueous emulsion consisting essentially of an ester wax which is the reaction product of oxidized montan wax and a polyhydric aliphatic alcohol containing at most six carbon atoms, said ester wax having a saponification number of at least 100, a nonionic emulsifier, and a compound selected from the group consisting of high molecular, paraffinic waxes and their air-oxidation products, said compound being present in an amount of about 15 to about 35% calculated upon the solids content of the emulsion and having a melting point of at least 65° C., the amount of the emulsifier ranging from 11 to about 20% of the total quantity of the ester wax and the hydrocarbon.

References Cited in the file of this patent

UNITED STATES PATENTS

| 2,409,683 | Howk et al. | Oct. 22, 1946 |
| 2,586,780 | Breuer et al. | Feb. 26, 1952 |
| 2,598,666 | Sesso et al. | June 3, 1952 |
| 2,634,677 | Klimkowsky et al. | Apr. 14, 1953 |
| 2,635,055 | Figdor | Apr. 14, 1953 |